United States Patent
Yang et al.

(10) Patent No.: US 11,448,898 B2
(45) Date of Patent: Sep. 20, 2022

(54) FLOATING IMAGE SYSTEM

(71) Applicant: Lixel Inc., Taipei (TW)

(72) Inventors: Chun-Hsiang Yang, Hsinchu (TW);
Chih-Hung Ting, New Taipei (TW);
Kai-Chieh Chang, Kaohsiung (TW)

(73) Assignee: Lixel Inc., Taipei (TW)

( * ) Notice: Subject to any disclaimer, the term of this patent is extended or adjusted under 35 U.S.C. 154(b) by 0 days.

(21) Appl. No.: 17/229,840

(22) Filed: Apr. 13, 2021

(65) Prior Publication Data

US 2022/0214560 A1 Jul. 7, 2022

(30) Foreign Application Priority Data

Jan. 6, 2021 (TW) .................................. 110100367

(51) Int. Cl.
*G02B 30/56* (2020.01)
*H04N 13/363* (2018.01)
*G06F 3/01* (2006.01)
*H04N 13/302* (2018.01)

(52) U.S. Cl.
CPC ............. *G02B 30/56* (2020.01); *G06F 3/013* (2013.01); *H04N 13/302* (2018.05); *H04N 13/363* (2018.05)

(58) Field of Classification Search
CPC ...... G02B 30/56; G06F 3/013; H04N 13/302; H04N 13/363
USPC ........................................................... 348/51
See application file for complete search history.

(56) References Cited

U.S. PATENT DOCUMENTS

| | | | | |
|---|---|---|---|---|
| 2010/0007636 | A1* | 1/2010 | Tomisawa | G06F 3/01 345/204 |
| 2013/0076876 | A1* | 3/2013 | Shimotani | G06F 3/013 348/51 |
| 2015/0220299 | A1* | 8/2015 | Kim | G06F 1/1635 345/1.3 |
| 2018/0048883 | A1* | 2/2018 | Yang | H04N 13/383 |

FOREIGN PATENT DOCUMENTS

| | | |
|---|---|---|
| TW | M412432 U1 | 9/2011 |
| TW | I700516 B | 8/2020 |

* cited by examiner

*Primary Examiner* — Ayman A Abaza
(74) *Attorney, Agent, or Firm* — Li & Cai Intellectual Property Office

(57) ABSTRACT

A floating image system is provided. The floating image system includes a controller, a first floating image display device electrically connected to the controller, and a second floating image display device electrically connected to the controller. The second floating display device is detachably connected to the first floating image display device. The first floating image display device and the second floating image display device provide a plurality of first floating images and a plurality of second floating images, respectively, so as to jointly display an integrated floating image.

12 Claims, 13 Drawing Sheets

FLOATING IMAGE SYSTEM

CROSS-REFERENCE TO RELATED PATENT APPLICATION

This application claims the benefit of priority to Taiwan Patent Application No. 110100367, filed on Jan. 6, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a floating image system, and more particularly to a floating image system simultaneously displaying two-dimensional images and three-dimensional images.

BACKGROUND OF THE DISCLOSURE

A conventional image display system is usually a two-dimensional flat-panel display device. In recent years, although increased resolution of the display device provides an enriched visual experience for the user, images of the display device are still provided from a fixed angle.

Therefore, it has become an important issue in the industry to provide a floating image system having a multi-angle background.

SUMMARY OF THE DISCLOSURE

In response to the above-referenced technical inadequacy, the present disclosure provides a floating image system.

In one aspect, the present disclosure provides a floating image system including a controller, a first floating image display device, and a second floating image display device. The first floating image display device is electrically connected to the controller. The second floating image display device is electrically connected to the controller, and the second floating display device is detachably connected to the first floating image display device. The first floating image display device and the second floating image display device provide a plurality of first floating images and a plurality of second floating images, respectively, so as to jointly display an integrated floating image.

One of the beneficial effects of the floating image system of the present disclosure is that the floating image system is able to provide a background that can simultaneously display the two-dimensional image and the three-dimensional floating image through a single floating image display device or a plurality of floating image display devices, so as to present a rich visual environment that can effectively improve the user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
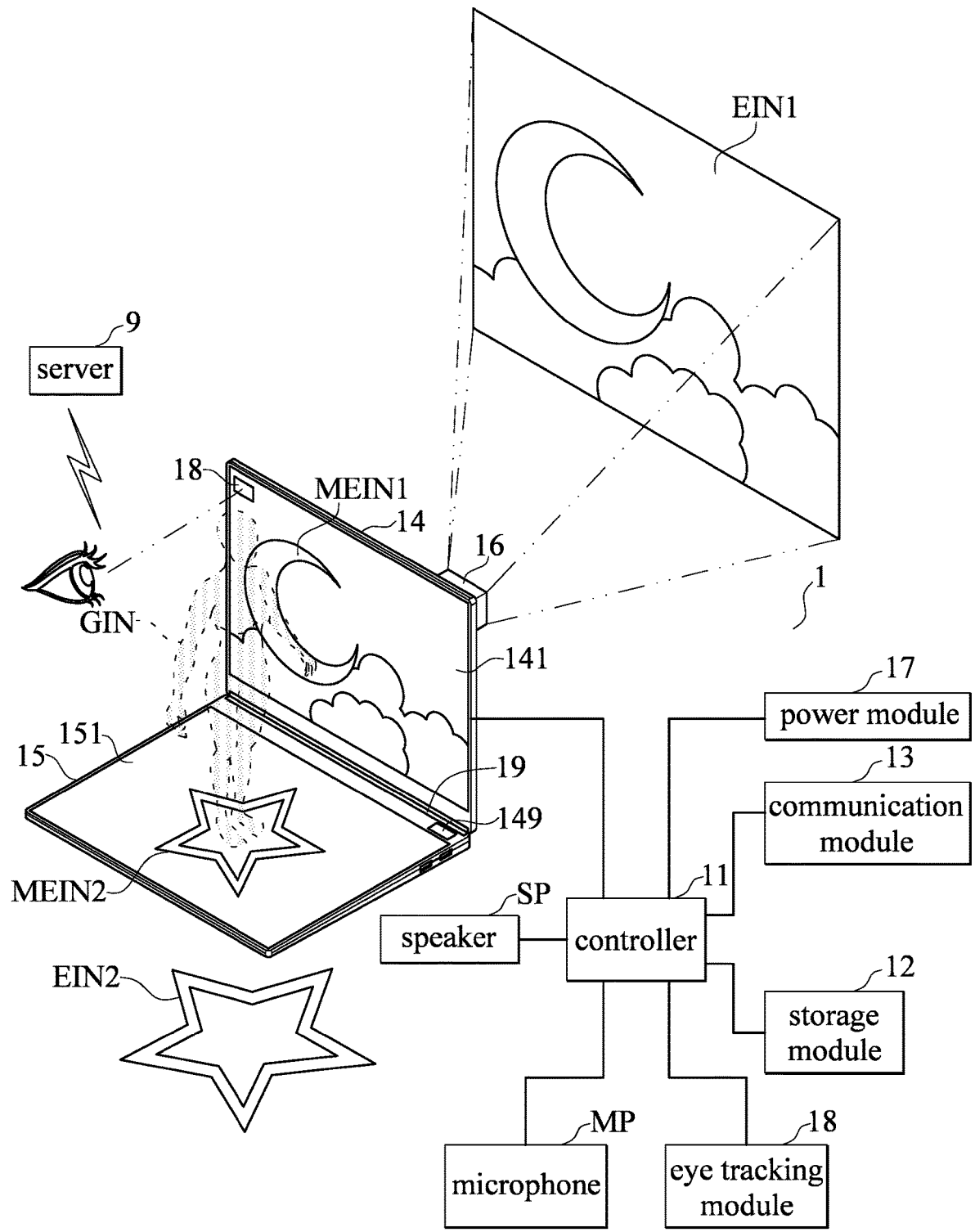
FIG. 1 is a schematic view of a floating image system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
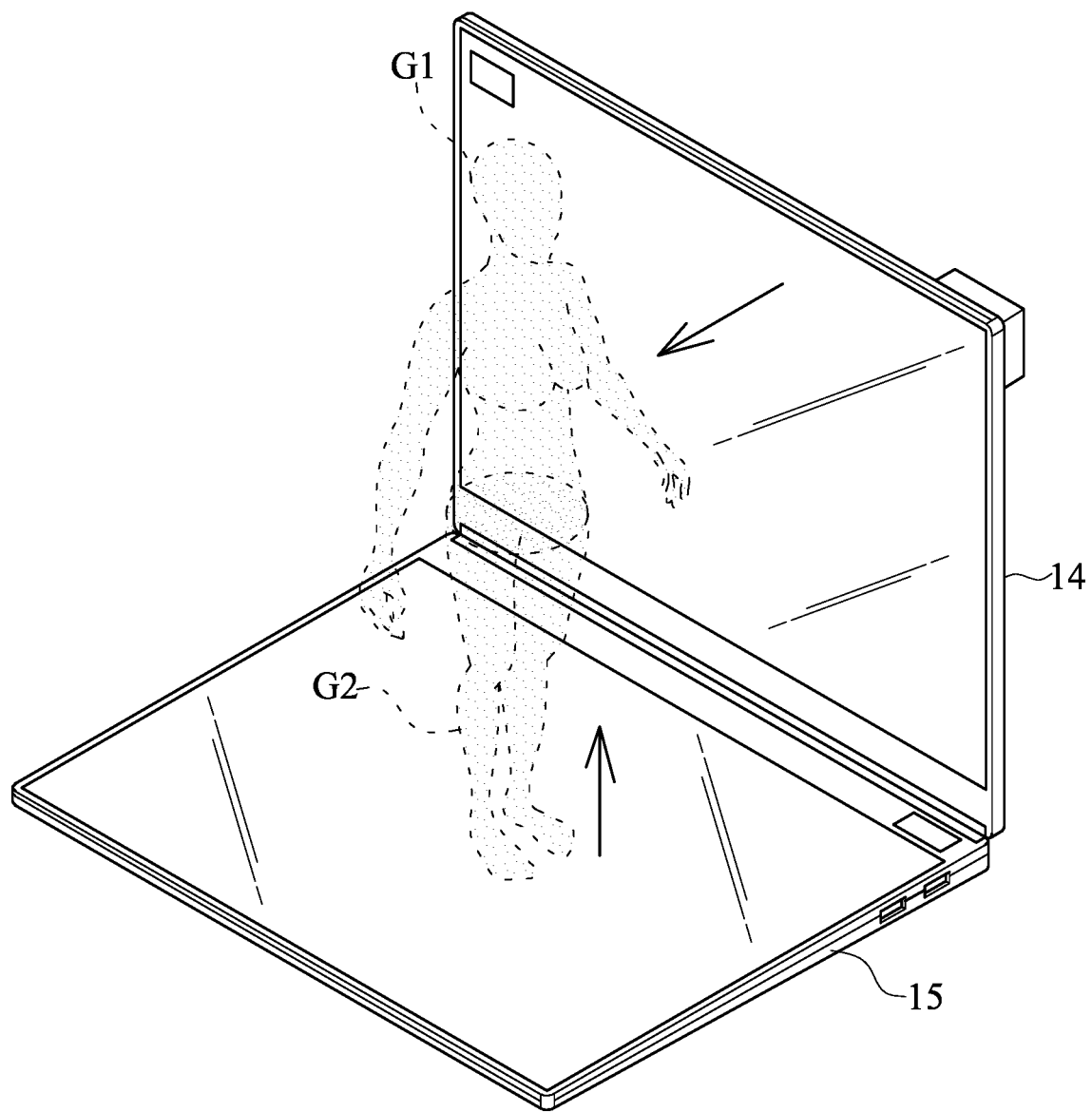
FIG. 2 is a schematic view showing a first floating image display device and a second floating image display device jointly displaying an integrated floating image.
Figure 3:
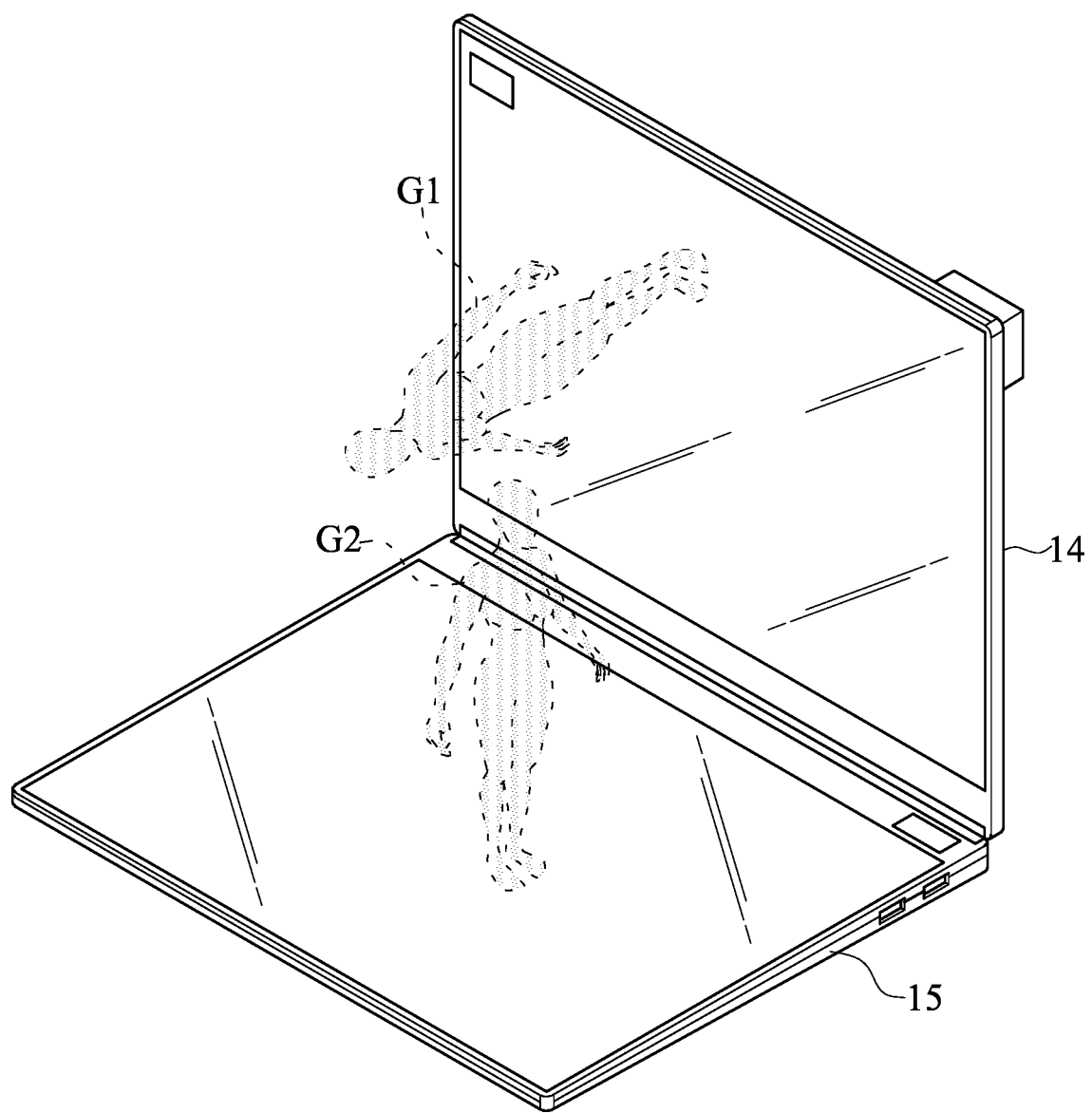
FIG. 3 is a schematic view of the first floating image display device and the second floating image display device respectively displaying a plurality of first floating images and a plurality of second floating images.

References are made to FIG. 1 to FIG. 3. FIG. 1 is a schematic view of a floating image system according to a first embodiment of the present disclosure.

FIG. 2 is a schematic view showing a first floating image display device and a second floating image display device jointly displaying an integrated floating image.

FIG. 3 is a schematic view of the first floating image display device and the second floating image display device respectively displaying a plurality of first floating images and a plurality of second floating images.

In this embodiment, a floating image system 1 includes a controller 11, a storage module 12, a communication module 13, a first floating image display device 14, a second floating image display device 15, an environment detection device 16, a power module 17, and an eye tracking sensor 18.

The controller 11 is electrically connected to the storage module 12, the communication module 13, the first floating image display device 14, the second floating image display device 15, the environment detection device 16, the power module 17, and the eye tracking sensor 18.

The second floating image display device 15 is detachably connected to the first floating image display device 14. That is to say, the first floating image display device 14 and the second floating image display device 15 can operate independently from or cooperatively with each other. The first floating image display device 14 is connected to one side of the second floating image display device 15. In this embodiment, the first floating image display device 14 is connected to the second floating image display device 14 through a connecting module 19. The connecting module 19 is a hinge. In another embodiment, the first floating image display device 14 can be electrically connected to the second floating image display device 15 to further improve a state of cooperative operation.

The connecting module 19 is disposed between the first floating image display device 14 and the second floating image display device 15. An angle θ is defined between the first floating image display device 14 and the second floating image display device 15.

In this embodiment, when the first floating image display device 14 is connected to the second floating image display device 15, the first floating image display device 14 and the second floating image display device 15 provide a plurality of first floating images G1 and a plurality of second floating images G2, respectively, so as to jointly display an integrated floating image GIN. The first floating images G1, the second floating images G2, and the integrated floating image GIN are all three-dimensional floating images. That is to say, a user can view the floating images from various angles.

That is to say, the first floating image display device 14 and the second floating image display device 15 can independently display a plurality of floating images, respectively. The first floating image display device 14 and the second floating image display device 15 can also respectively provide the floating images, so as to jointly display the integrated floating image GIN.

In addition, in this embodiment, the first floating image display device 14 displays the first floating images G1 in a space on a first side of the first floating image display device 14. The second floating image display device 15 also displays the second floating images G2 in a space on a first side of the second floating image display device 15. That is to say, the integrated floating image GIN is displayed in the space between the first floating image display device 14 and the second floating image display device 15.

In this embodiment, the environment detection device 16 is disposed on the second side of the first floating image display device 14. The environment detection device 16 is used to detect a plurality of first environment images EIN1 on a second side of the first floating image display device 14.

In another embodiment, the environment detection device 16 can be disposed on the second side of the first floating image display device 14 or a second side of the second floating image display device 15 for detecting the first environment images EIN1 on the second side of the first floating image display device 14 or a plurality of second environment images EIN2 on a second side of the second floating image display device 15. In this embodiment, the first side and the second side of the first floating image display device 14 are opposite to each other. The first side and the second side of the second floating image display device 15 are also opposite to each other. The second side of the second floating image display device 15 is a relatively lower side, and the first side of the second floating image display device 15 is a relatively upper side. The environment detection device 16 transmits the first environment images or the second environment images to the controller 11.

The controller 11 displays a plurality of first environment adjustment images MEIN1 on a first display module 141 on the first side of the first floating image display device 14 according to the first environment images EIN1.

In another embodiment, the controller 11 can display a plurality of second environment adjustment images MEIN2 on a second display module 151 on the first side of the second floating image display device 15 according to the second environment images EIN2.

In addition, the first environment adjustment images MEIN1 and the second environment adjustment images MEIN2 can also be obtained through calculating a predetermined two-dimensional image or predetermined three-dimensional image (e.g., image including depth information).

The eye tracking sensor 18 is disposed on the first side of the first floating image display device 14 or the first side of the second floating image display device 15, so as to detect a user eyesight signal. In this embodiment, the eye tracking sensor 18 is disposed on the first side of the first floating image display device 14. The eye tracking sensor 18 is a camera unit. The user eyesight signal detected by the eye tracking sensor 18 includes a pupil position and an eyesight angle of a user.

The controller 11 adjusts the first environment adjustment images MEIN1 displayed by the first display module 141 or the second environment adjustment images MEIN2 displayed by the second display module 151 according to the user eyesight signal.

In addition, the controller 11 of the floating image system 1 can be connected to a server 9 through a communication module. The controller 11 in the floating image system 1 can transmit the first floating images G1, the second floating images G2, the integrated floating image GIN, the first environment images EIN1, the second environment images EIN2, the first environment adjustment images MEIN1, and the second environment adjustment images MEIN2 to the server 9 for calculation. That is to say, the first environment adjustment images MEIN1 and the second environment adjustment images MEIN2 of the floating image system 1 can be adjusted according to the eyesight angle of the user. At this time, the environment that is observed from the eyesight angle of the user is integrated with the first environment adjustment images MEIN1 and the second environment adjustment images MEIN2. That is to say, whichever direction the user looks toward, the first environment adjustment images MEIN1 and the second environment adjustment images MEIN2 are all images showing the eyesight angle of the user, so that the user will not feel a vision thereof being blocked by the floating image display device 14 and the second floating image display device 15; on the contrary, the user can also see environmental images behind the first floating image display device 14 and the second floating image display device 15 through the first floating image display device 14 and the second floating image display device 15, such that the user has a feeling of a broader vision or a transparent vision.

The power module 17 is used to provide a driving power to the controller 11, the storage module 12, the communication module 13, the first floating image display device 14, the second floating image display device 15, the environment detection device 16, and the eye tracking sensor 18.

In addition, the first floating images G1, the second floating images G2, the integrated floating image GIN, the first environment images EIN1, the second environment images EIN2, the first environment adjustment images MEIN1, and the second environment adjustment images MEIN2 can be stored in the storage module 12 or the server 9.

The user eyesight signal directly affects an effect of environment images presentation. That is to say, the user can have different user experiences of the first environment adjustment images MEIN1 when the user observes the integrated floating image GIN from different angles. In addition, when the second floating image display device 15 also provides the second environment adjustment images MEIN2, the user can also have different user experiences of the second environment adjustment images MEIN2 when the user observes the integrated floating image GIN from different angles.

The controller 11 is a central processing unit (CPU), a graphics processing unit (GPU), an application-specific integrated circuit (ASIC), or a microprocessor (MCU).

The storage module 12 is a flash memory, a read-only memory, a programmable read-only memory, an electronically rewritable read-only memory, an erasable and programmable read-only memory, or an electronically erasable and programmable read-only memory.

The communication module 13 includes a wired communication unit (not shown in the figures) and a wireless communication unit (not shown in the figures). The wired communication unit (not shown in the figures) can also be independently communicated with the server 9, so as to receive control signals from the server 9 or data in a database of the server 9. When the communication module 13 is a wireless communication unit, the communication module 13 can be a WI-FI® communication unit, a BLUETOOTH® communication unit, a Zigbee communication unit, a LoRa communication unit, a Sigfox communication unit, or an NB-IoT communication unit.

The environment detection device 16 includes at least one image capturing unit. The environment detection device 16 can be a visible light image capturing unit, an infrared image capturing unit, or a thermal imaging unit. In another embodiment, the environment detection device 16 can include an optical sensor, an image capture module, a timer, a gyroscope sensor, a multi-dimensional acceleration sensor, or an odor sensor.

The power module 17 can be a direct current (DC) to direct current (DC-to-DC) converter or an alternating current to DC (AC-to-DC) converter. The power module 17 can also include a battery unit (not shown in the figures). The battery unit (not shown in the figures) is a lithium ion battery, a lithium manganese battery, a lithium polymer battery, or a nickel hydrogen battery.

The eye tracking sensor 18 is an image capturing unit. The eye tracking sensor 18 can be a visible light image capturing unit, an infrared image capturing unit or a thermal imaging unit.

In addition, the floating image system 1 further includes a microphone MP and a speaker SP. The microphone MP and the speaker SP are electrically connected to the controller 11. The user can use audio control signals to control and interact with the first floating images G1, the second floating images G2, or the integrated floating image GIN through the microphone MP and the speaker SP.

In addition, the controller 11, the storage module 12, the communication module 13, the first floating image display device 14, the second floating image display device 15, the environment detection device 16, the power supply module 17, the eye tracking sensor 18, the microphone MP, and the speaker SP can be disposed in a casing (not shown in the figures).

In another embodiment, the controller 11, the storage module 12, the communication module 13, the environment detection device 16, the power module 17, the eye tracking sensor 18, the microphone MP, and the speaker SP can be disposed in the first floating image display device 14 or the second floating image display device 15. That is to say, either the first floating image display device 14 or the second floating image display device 15 can independently process the two-dimensional image or the three-dimensional floating image. When the first floating image display device 14 and the second floating image display device 15 are electrically connected to each other, respective components in the first floating image display device 14 and the second floating image display device 15 can share resources and operate cooperatively with each other.

Figure 4:
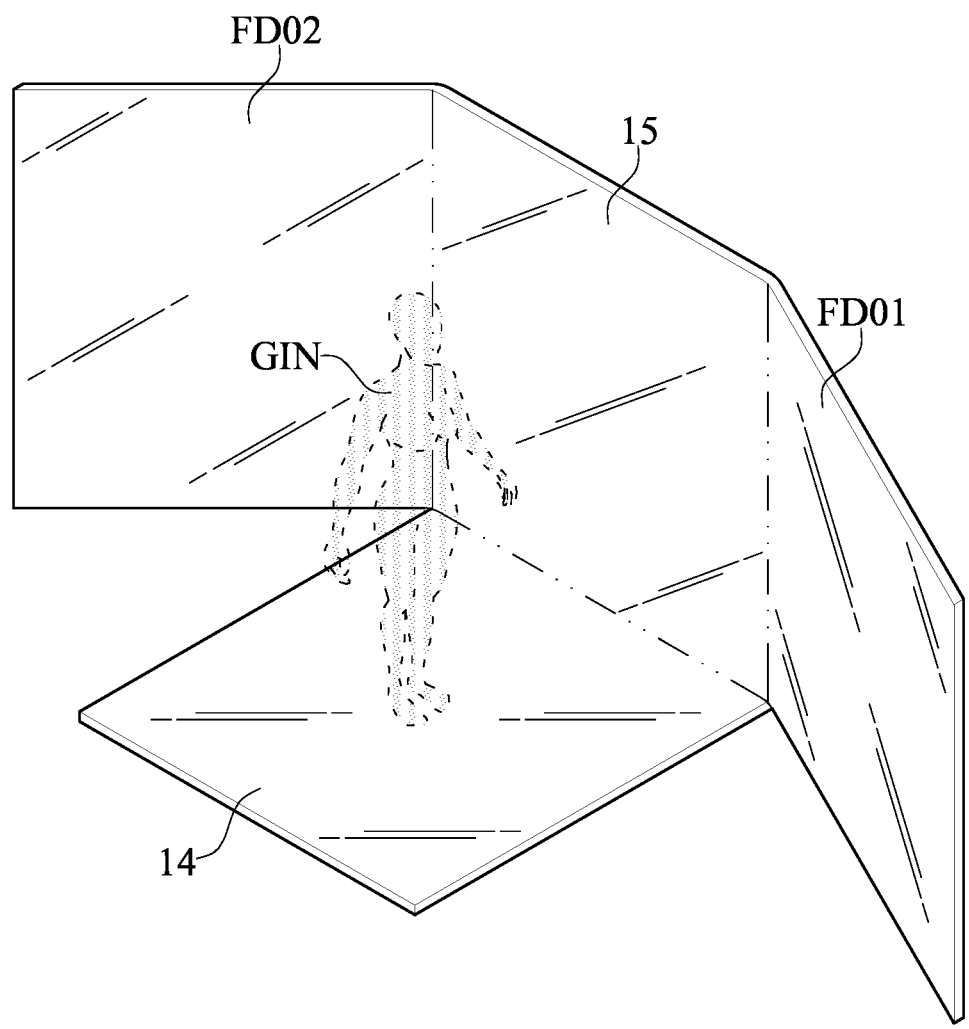
FIG. 4 is another schematic view of the floating image system of the present disclosure.
Figure 5:
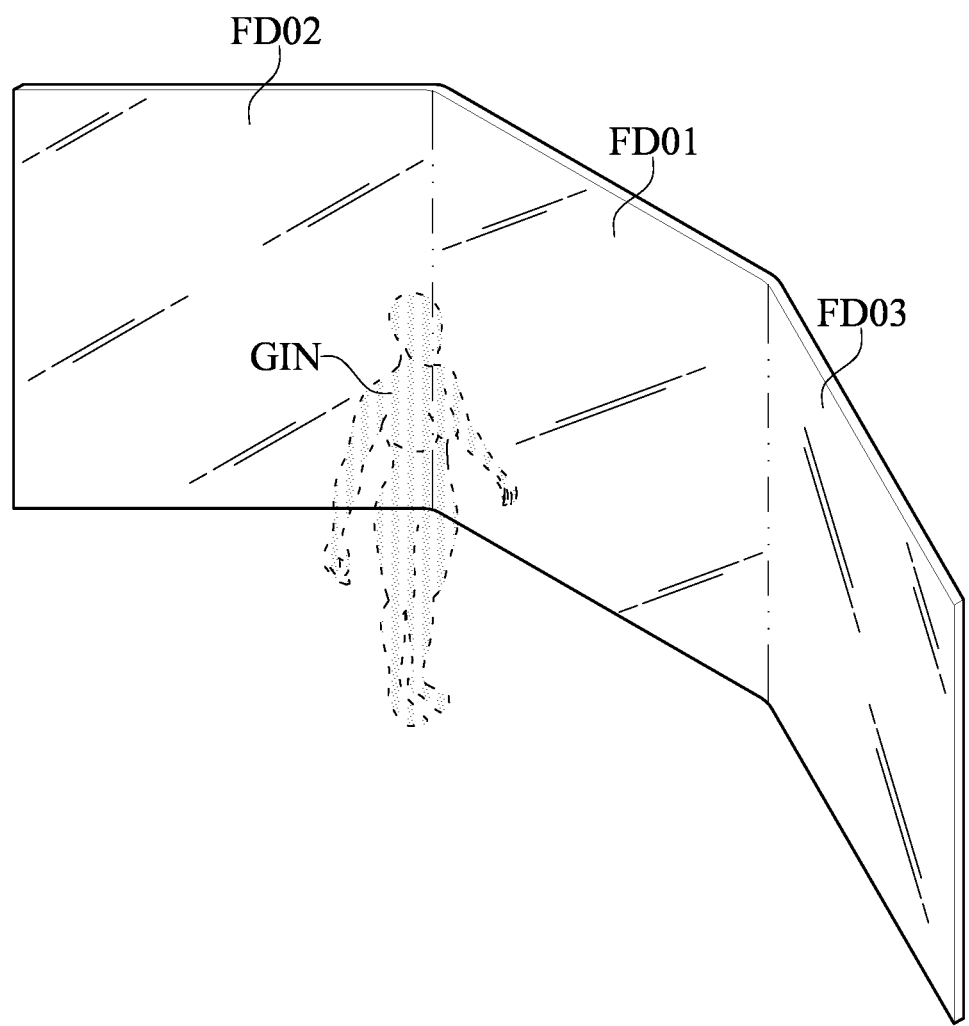
FIG. 5 is yet another schematic view of the floating image system of the present disclosure.
Figure 6:
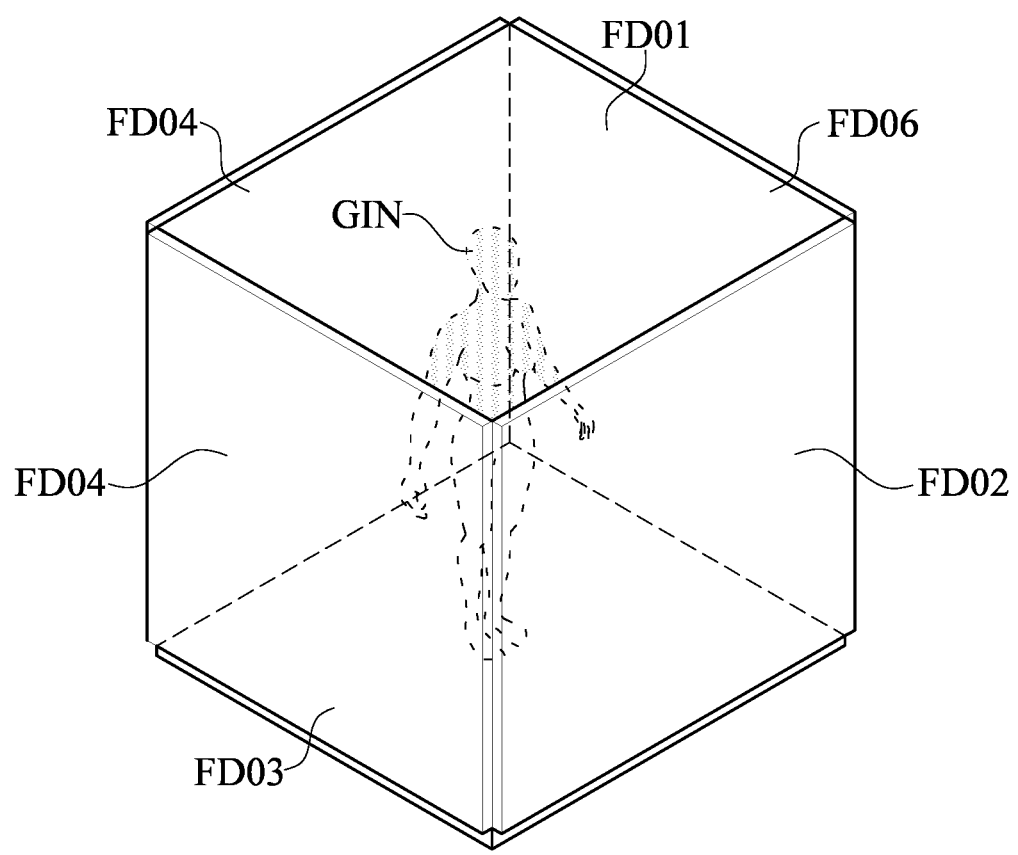
FIG. 6 is still another schematic view of the floating image system of the present disclosure.

References are made to FIG. 4, FIG. 5, and FIG. 6. In this embodiment, the floating image system 1 can be connected through a plurality of floating image display devices, as shown in FIG. 4, FIG. 5, and FIG. 6.

As shown in FIG. 4, a floating image display device FD01 and a floating image display device FD02 are detachably disposed on two sides of the first floating image display device 14 and the second floating image display device 15.

As shown in FIG. 5, the floating image display device FD01, the floating image display device FD02, and a floating image display device FD03 are horizontally and detachably connected with one another.

As shown in FIG. 6, the floating image display device FD01, the floating image display device FD02, the floating image display device FD03, a floating image display device FD04, a floating image display device FD05, and a floating image display device FD06 are used to construct a space, and the six floating image display devices can display the floating images, respectively, or the six floating image display devices can jointly display a plurality of integrated floating images. In other embodiments, the floating image system 1 can provide the floating images through a different manner of connection of the floating image display devices included therein.

In this embodiment, before the floating image system 1 displays an intact stereoscopic floating image, the controller 11 divides the intact stereoscopic floating image into different areas through a computer algorithm and an image can then be determined for each of the areas after a calculation. The different areas are formed by light emitted by a plurality of display units of the first floating image display device 14 or a plurality of display units of the second floating image display device 15 converging and focusing in a space, and combining the different areas together to form the intact stereoscopic floating image. That is, the first floating image display device 14 can display a part of the integrated floating image GIN (i.e., the intact stereoscopic floating image).

The second floating image display device 15 can display another part of the integrated floating image GIN, and the above two parts of the integrated floating image GIN can be combined into the integrated floating image GIN that is intact and complete.

In addition, the controller 11 can adjust the computer algorithm, the display units of the first floating image display device 14, and the display units of the second floating image display device 15 according to the angle defined therebetween, such that the first floating image display device 14 and the second floating image display device 15 can provide light having appropriate angles for converging and focusing in a space to form the integrated floating image GIN.

Second Embodiment

Figure 7:
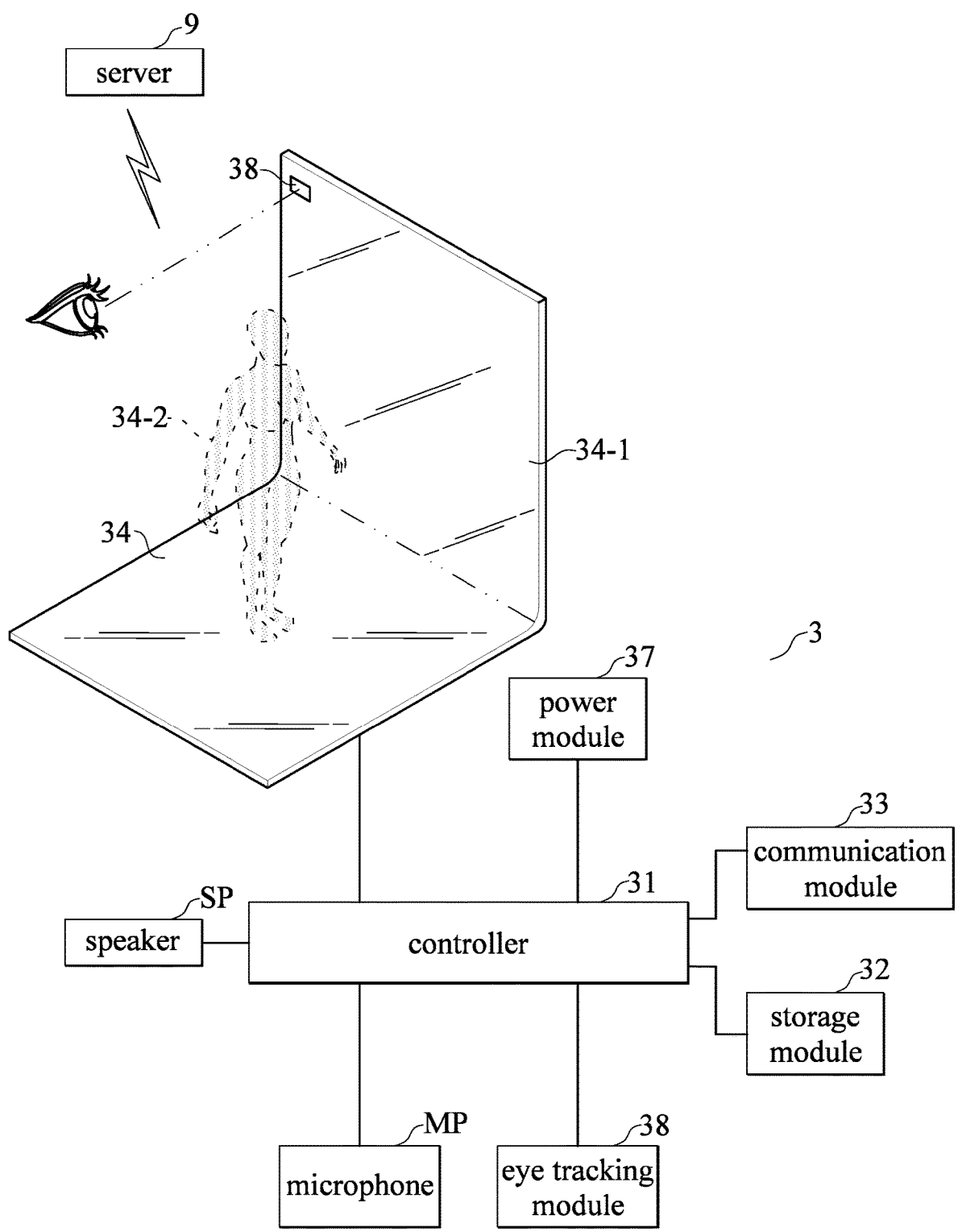
FIG. 7 is a schematic view of the floating image system according to a second embodiment of the present disclosure.
Figure 8:
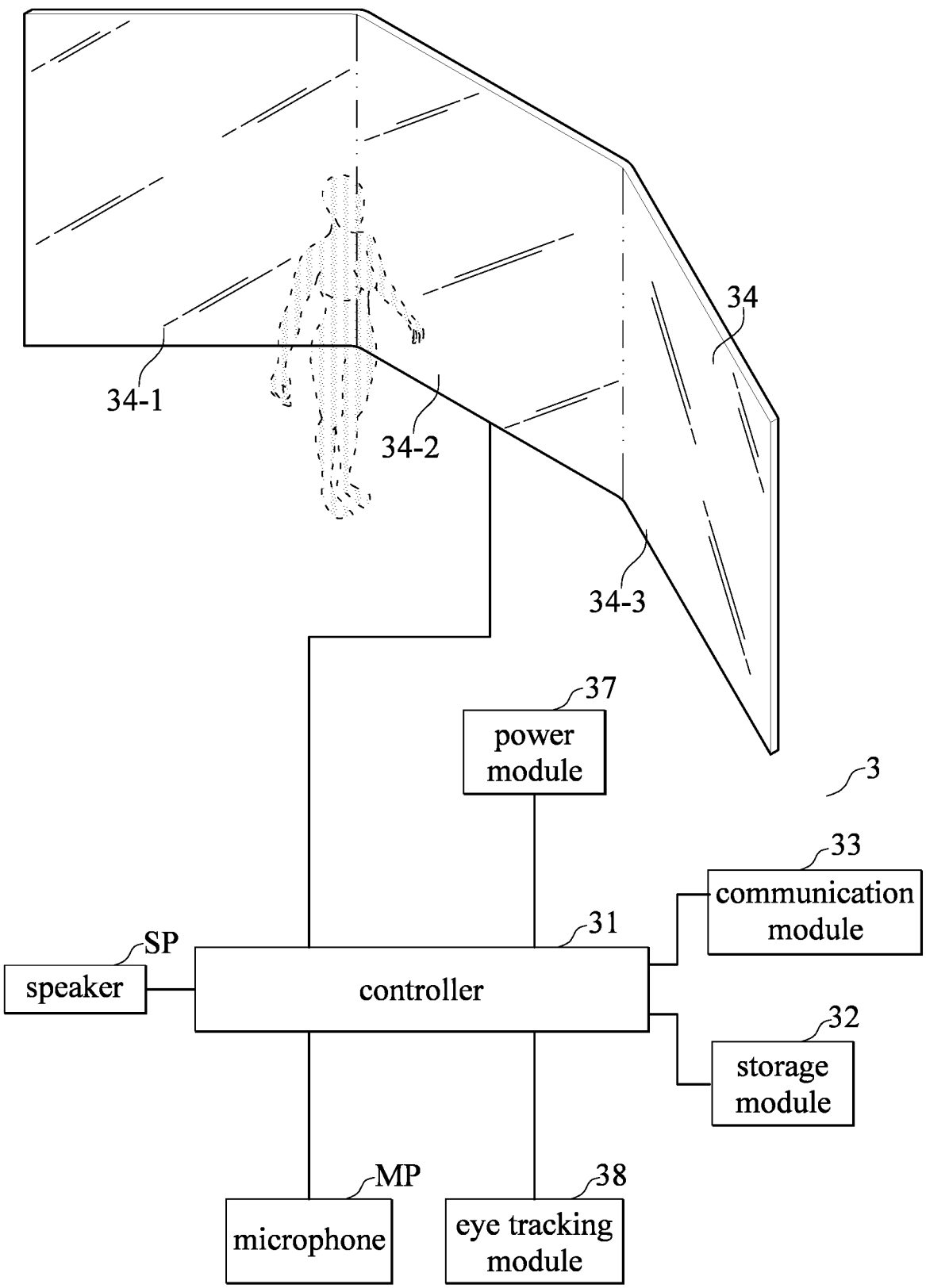
FIG. 8 is another schematic view of the floating image system according to the second embodiment of the present disclosure.

References are made to FIG. 7 and FIG. 8. FIG. 7 is a schematic view of the floating image system according to a second embodiment of the present disclosure. FIG. 8 is another schematic view of the floating image system according to the second embodiment of the present disclosure.

In this embodiment, a floating image system 3 includes a controller 31, a storage module 32, a communication module 33, a first floating image display device 34, an environment detection device 36, a power module 37, and an eye tracking sensor 38. The controller 31 is electrically connected to the storage module 32, the communication module 33, the first floating image display device 34, the environment detection device 36, the power module 37, and the eye tracking sensor 38.

The floating image system 3 is similar to the floating image system 1, the difference between the floating image system 3 and the floating image system 1 is mainly that the first floating image display device 34 of the floating image system 3 is a foldable display device. That is to say, a mechanical design of a display module and a casing of the first floating image display device 34 allows the first floating image display device 34 to be folded as two display areas. In other words, when the first floating image display device 34 is folded, the first floating image display device 34 includes at least one first floating image display area 34-1 and a second floating image display area 34-2. The first floating image display area 34-1 and the second floating image display area 34-2 are disposed adjacent to each other, and the first floating image display device 34 is folded into the first floating image display area 34-1 and the second floating image display area 34-2. A display angle α is defined between the first floating image display area 34-1 and the second floating image display area 34-2. The display angle α can be between 0 degrees and 179 degrees. In other embodiments, the display angle α can be an obtuse angle.

The first floating image display area 34-1 and the second floating image display area 34-2 of the first floating image display device 34 can respectively display different floating images. The first floating image display area 34-1 and the second floating image display area 34-2 can also respectively provide a plurality of first floating images and a plurality of second floating images to jointly display an integrated floating image GIN.

As shown in FIG. 8, the first floating image display device 34 can be folded into three display areas, i.e., the first floating image display area 34-1, the second floating image display area 34-2, and the third floating image display area 34-3 of the first floating image display device 34. The first floating image display area 34-1, the second floating image display area 34-2, and the third floating image display area 34-3 are disposed adjacent to one another. Similarly, the first floating image display area 34-1, the second floating image display area 34-2, and the third floating image display area 34-3 can respectively provide a plurality of floating images. The first floating image display area 34-1, the second floating image display area 34-2, and the third floating image display area 34-3 can also respectively provide the first floating images, the second floating images, and third floating images, so as to jointly display at least one of the integrated floating image GIN.

Figure 9:
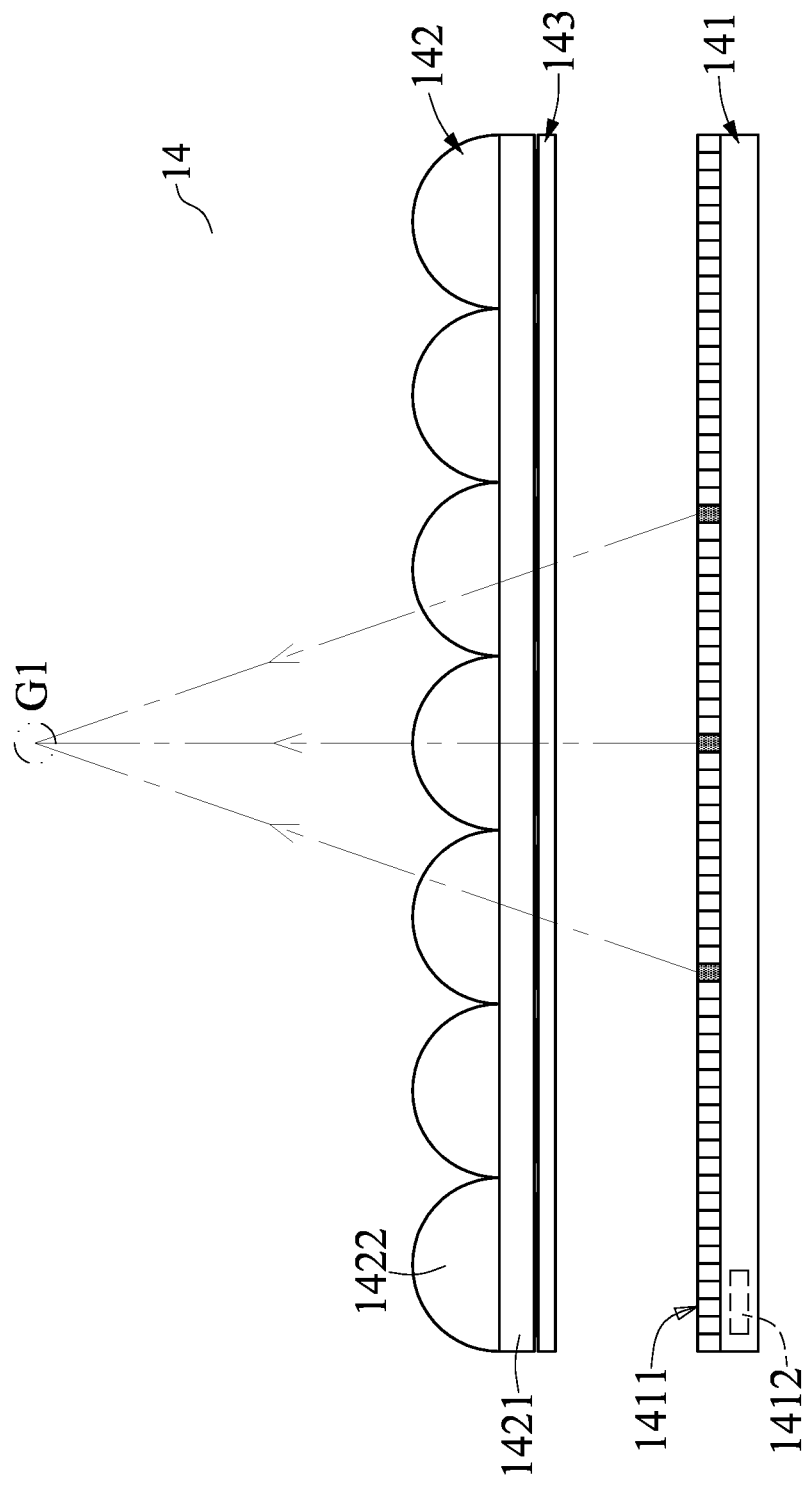
FIG. 9 is a schematic view of the first floating image display device of the present disclosure.
Figure 10:
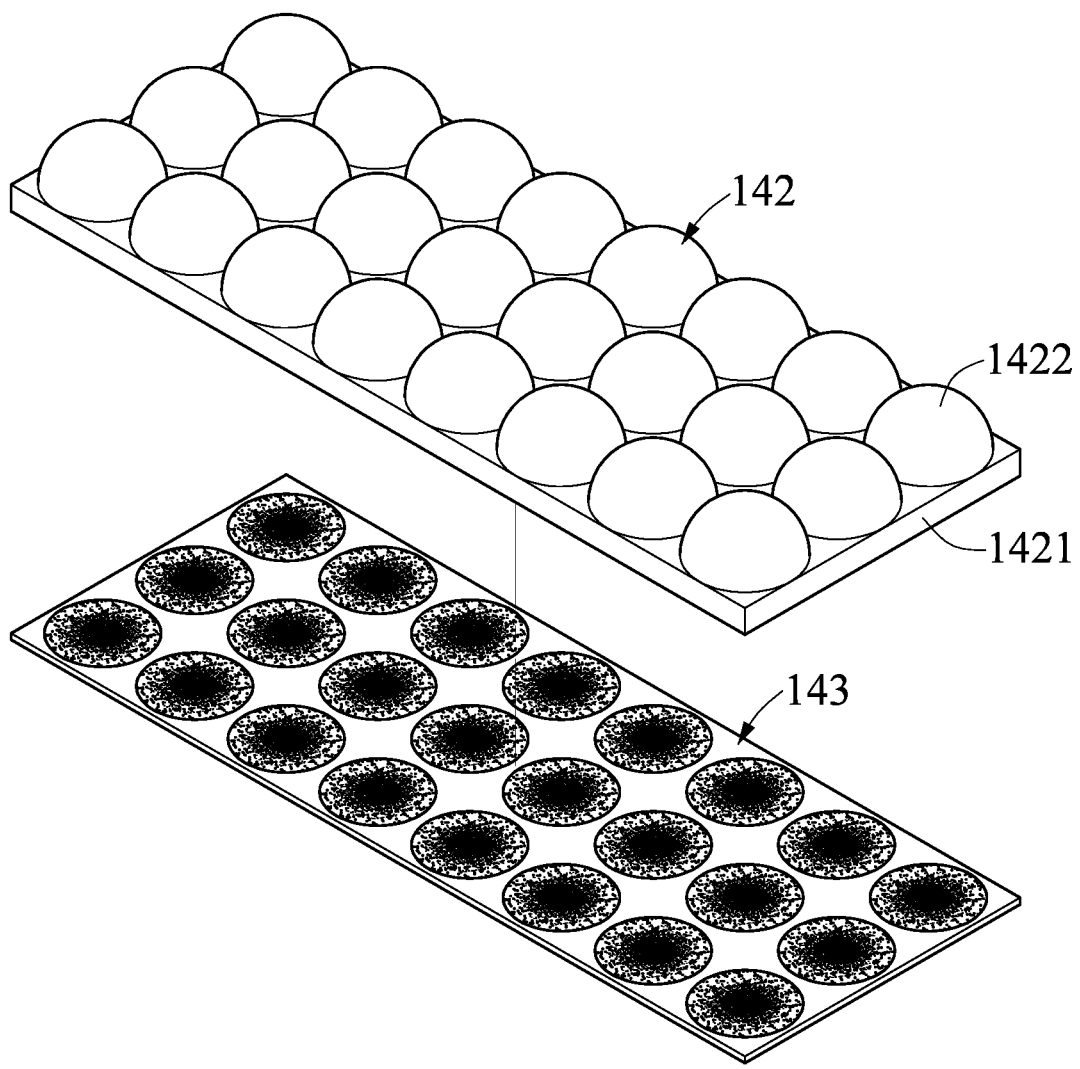
FIG. 10 is a schematic exploded view of the first floating image display device of the present disclosure.
Figure 11:
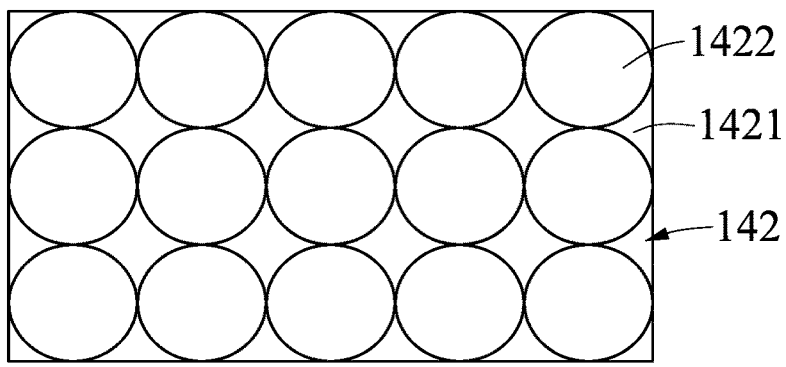
FIG. 11 is a schematic view of a relative arrangement of a lens array of the first floating image display device of the present disclosure.
Figure 12:
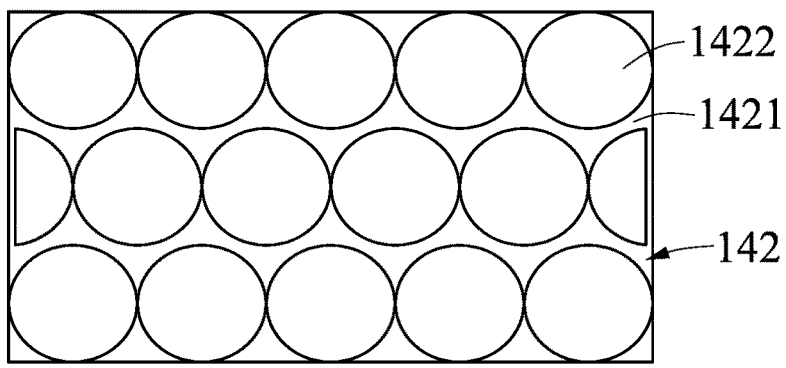
FIG. 12 is a schematic view of a staggered arrangement of the lens array of the first floating image display device of the present disclosure.
Figure 13:
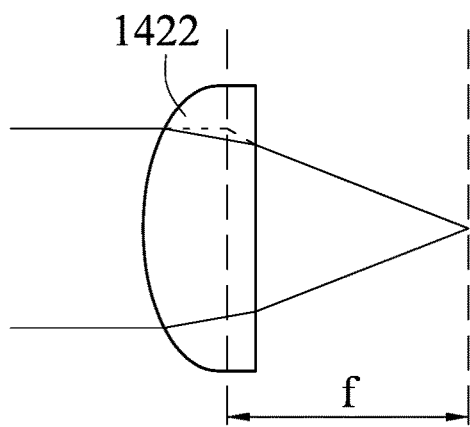
FIG. 13 is a schematic view showing a focusing of a single lens of the first floating image display device of the present disclosure.

References are made to FIG. 9, FIG. 10, FIG. 11, FIG. 12, and FIG. 13. FIG. 9 is a schematic view of the first floating image display device of the present disclosure. FIG. 10 is a schematic exploded view of the first floating image display device of the present disclosure. FIG. 11 is a schematic view of a relative arrangement of a lens array of the first floating image display device of the present disclosure. FIG. 12 is a schematic view of a staggered arrangement of the lens array of the first floating image display device of the present disclosure. FIG. 13 is a schematic view showing focusing of a single lens of the first floating image display device of the present disclosure.

Structures and functions of the first floating image display device 14 is similar to that of the second floating image display device 15. In the following, only the first floating image display device 14 is exemplified, and the structure and the function of the second floating image display device 15 will not be reiterated herein.

The first floating image display device 14 includes a first display module 141, a lens array layer 142, and a microstructure layer 143, which can change the stereoscopic image seen from a perspective of a viewer through changing the displayed images, such that the viewer is allowed to see stereoscopic images from other perspectives.

In addition, the microstructure layer 143 is a dynamic optical element layer. That is to say, the microstructure layer 143 has a microstructure function mode and a non-microstructure function mode. The microstructure layer 143 can be switched between the microstructure function mode and the non-microstructure function mode according to a control signal. When the microstructure layer 143 is switched to the microstructure function mode, the microstructure layer 143 can be used to adjust light angles. When the microstructure layer 143 is switched to the non-microstructure function mode, the first floating image display device 14 is used to display a two-dimensional image, and cannot display a three-dimensional image floating in the space on one side of the first floating image display device 14. However, in this embodiment, the first floating image display device 14 can simultaneously display the two-dimensional image and the floating images.

The microstructure layer 143 is a liquid crystal lens layer including a plurality of microstructure liquid crystal lenses, and the lens array layer is also a liquid crystal lens layer including a plurality of optical adjustment liquid crystal lenses. That is to say, the first floating image display device 14 is a display device including at least two liquid crystal lens array layers. In other embodiments, the first floating image display device 14 can include more of the liquid crystal lens array layers for light adjustment. Furthermore, in other embodiments, the first floating image display device 14 can include different quantities of the first floating image display device 14 in different areas for the light adjustment. In addition, the lens array layer 142 includes a first structure lens array layer (not shown in the figures) and a second structure lens array layer (not shown in the figures). The first structure lens array layer (not shown in the figures) includes a lens structure that can be used to adjust a light field, and the second structure lens array layer (not shown in the figures) does not include a lens structure.

The lens array layer 142 can be disposed on a second layer (i.e., a middle layer), and the lens array layer 142 has a function of adjusting the light field. A condenser lens can control the light angles of the integrated floating image GIN, so that the user can see the three-dimensional image from different angles and thereby have a stereoscopic feeling. In addition, different condensing lenses can provide different angle information to an object point. The lights are converged in the air by different lenses to form a point with depth data, and point out that the information of a point in a space can be divided into different light angles and be recorded on pixels of the different lenses. A curvature of the condenser lens is determined by a material thereof, and in cooperation with first display module 141, a height, a viewing angle range, and a definition of the stereoscopic image can be determined. Images displayed on the display surface 1411 that are not yet combined (i.e., reconstructed) can be focused on an upper surface of the lens or in the space above the lens through the lens array layer 142. In other embodiments, the microstructure layer 143 may be absent from the first floating image display device 14.

The first display module 141 can be a conventional flat panel display, and the first display module 141 can include a display surface 1411 for displaying images. The lens array layer 142 is disposed adjacent to the display surface 1411 of the first display module 141, i.e., the lens array layer 142 can be disposed above the first display module 141. The lens array layer 142 can be in contact with the display surface 1411 of the first display module 141, and the lens array layer 142 can also be spaced apart from the display surface 1411 of the first display module 141, or be arranged as an intermediate layer between the display surface 1411 of the first display module 141 and the lens array layer 142.

The first display module 141 can be arranged as a bottom layer for displaying a planar image which is not reproduced by light. The planar image can be redistributed and reconstructed through the lens array of the lens array layer 142, so as to display a reconstructed stereoscopic three-dimensional image. The first display module 141, which can be arranged on a top layer, is only required to display the target image, and can be any hardware structure including mobile phones, tablets, or flat screens. A type and a structure of the first display module 141 are not limited in the present disclosure. The first display module 141 can also be a light emitting display device.

The lens array layer 142 can also be arranged on the top layer. The lens array layer 142 has a function of adjusting the light field. The lens array layer 142 can adjust the light angles of the integrated floating image GIN, allowing the planar images that are not reconstructed to be redistributed and reconstructed, such that the viewers see the reconstructed stereoscopic three-dimensional image.

The lens array layer 142 is made of a material with good optical properties, and the material of the lens array layer 142 is not limited in the present disclosure. The lens array layer 142 can include a base 1421 and a plurality of lenses 1422. The lenses 1422 are disposed on one side of the base 1421, i.e., the lenses 1422 can be arranged on one side of the base 1421 away from the first display module 141. An arrangement and a structure of the lens array layer 142 are not limited in the present disclosure. The lenses 1422 have a focusing function, and the not yet reconstructed planar images displayed on the display surface 1411 can be reconstructed by the lens array layer 142, and be combined into the integrated stereoscopic image.

The first display module 141 can be of any specifications, as long as the algorithm can be applied thereto. In addition, the first display module 141 also includes an image calculation unit 1412, and the images used in the first display module 141 need to be calculated by an image algorithm. The calculation is used in combination with the structure of the lens array to predict various paths of the lights and calculate relative positions of the images.

The lens array layer 142 of the present disclosure is of high importance with the displaying effect. As shown in FIG. 9, the arrangement of the lens array can be a rectangular arrangement, so that the lenses 1422 of every two adjacent rows can be relatively arranged. As shown in FIG. 10, the arrangement of the lens array can also be a hexagonal arrangement, so that the lenses 1422 of every two adjacent rows can be arranged in a staggered arrangement. In addition, the lenses 1422 can also be arranged in other ways that can display the three-dimensional image.

The microstructure on the lens array layer 142 includes lenses having a focusing function. The specification of the lenses (i.e., the microstructure) determines a focusing ability according to a refractive index n of the material, and a light having a wavelength between 300 nm and 1100 nm can be used. A focal length of a single one of the lenses is shown in FIG. 11, which conforms to the lens maker's formula: $1/f=(n-1)(1/R_1-1/R_2)$. $R_1$ and $R_2$ are the radii of curvature on both sides of the lens, respectively, f is the focal length of the lens, and n is the refractive index of the lens. In addition, a size of the lens diameter ranging from 100 μm to 5 mm is suitable for different pixel sizes of different display devices. In other embodiments, the microstructure of the lens array layer 142 can be an aspheric lens or a thick lens having optical characteristics that are different from those of the aforementioned lens maker's formula, and the present disclosure is not limited thereto. In other embodiments, the microstructures may be absent from the lens array layer 142.

Figure 14:
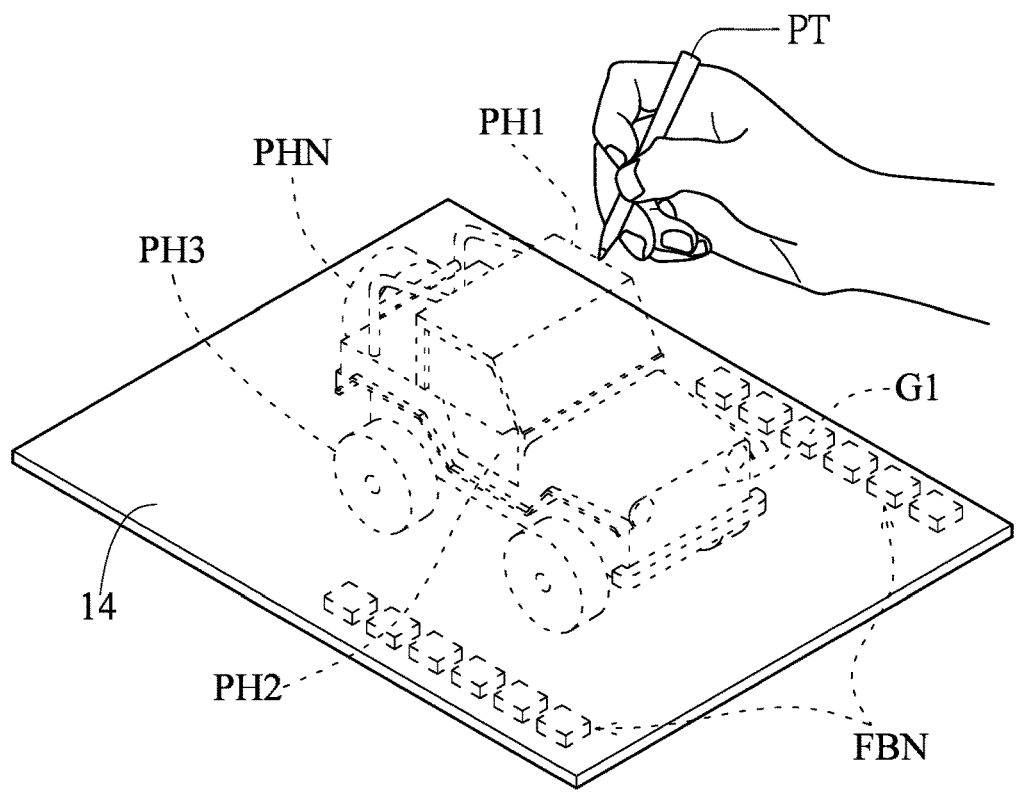
FIG. 14 is a schematic view of the first floating images of the first floating image display device or the second floating images of the second floating image display device interacting with an object.
Figure 15:
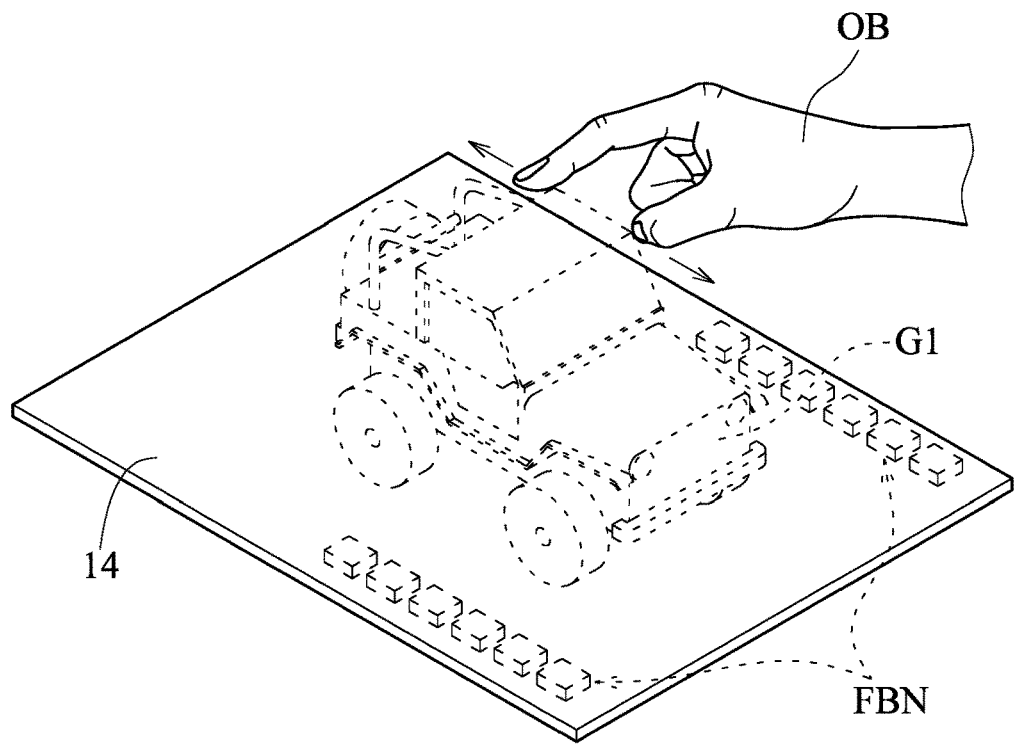
FIG. 15 is another schematic view of the first floating images of the first floating image display device or the second floating images of the second floating image display device interacting with the object.
Figure 16:
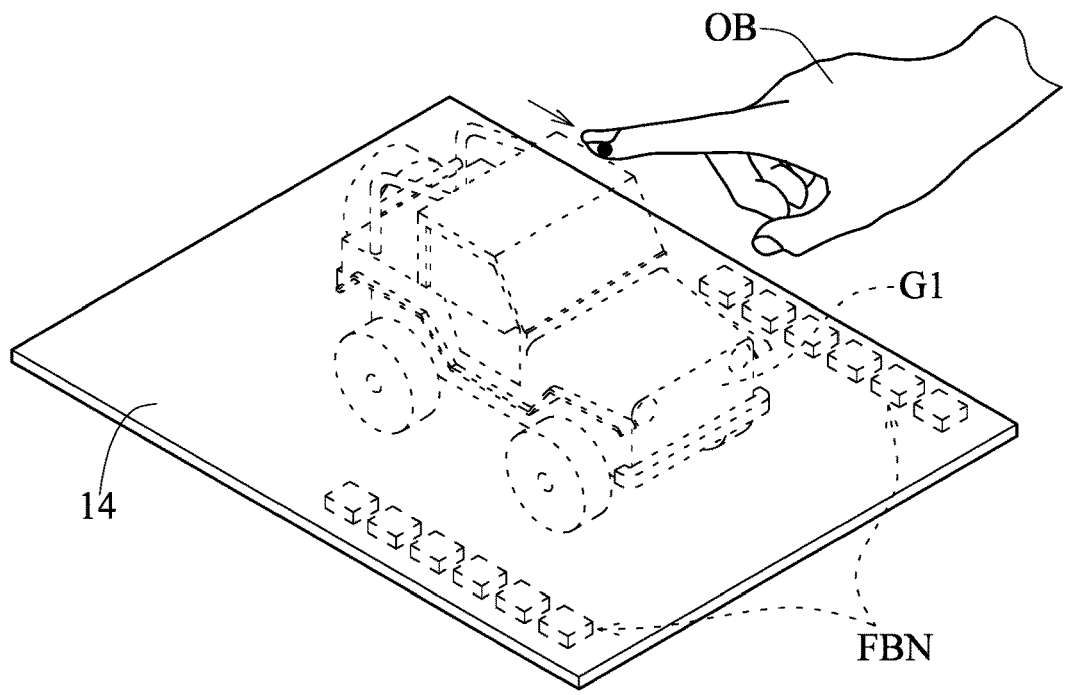
FIG. 16 is yet another schematic view of the first floating images of the first floating image display device or the second floating images of the second floating image display device interacting with the object.
Figure 17:
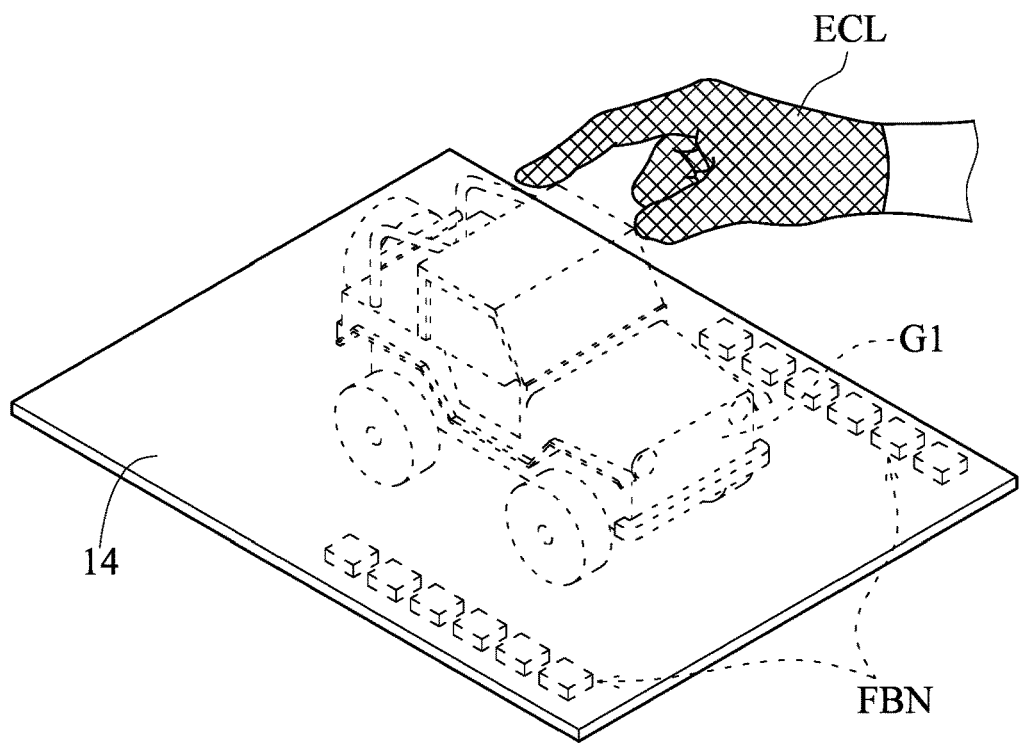
FIG. 17 is still another schematic view of the first floating images of the first floating image display device or the second floating images of the second floating image display device interacting with the object.

References are made to FIG. 14, FIG. 15, FIG. 16, and FIG. 17. FIG. 14 is a schematic view of the first floating images of the first floating image display device or the second floating images of the second floating image display device interacting with an object. FIG. 15 is another schematic view of the first floating images of the first floating image display device or the second floating images of the second floating image display device interacting with the object. FIG. 16 is yet another schematic view of the first floating images of the first floating image display device or the second floating images of the second floating image display device interacting with the object. FIG. 17 is still another schematic view of the first floating images of the first floating image display device or the second floating images of the second floating image display device interacting with the object.

The user can interact with the first floating images G1, the second floating images G2, or the integrated floating image GIN with fingers, electronic interactive gloves ECL, and a pen-shaped interactive element PT.

That is to say, a sensor 149 of the first floating image display device 14 can be used to detect a coordinate (e.g., a three-dimensional coordinate) of a predetermined detection point of an object OB (i.e., a hand of the user), such as an index finger of the user, at least one predetermined coordinate of the electronic interactive glove ECL, and a predetermined coordinate of a pen tip of the pen-shaped interactive element PT. The sensor 149 continuously records a movement track of the predetermined detection point of the object OB within a predetermined period of time. The sensor 149 transmits coordinate values of the movement track of the predetermined detection point of the object OB within a predetermined period of time to the controller 11. The controller 11 then determines an interactive state of the first floating images G1 according to the index finger of the user, the at least one predetermined coordinate of the electronic interactive glove ECL, and the predetermined coordinate of the pen tip of the pen-shaped interactive element PT. In this embodiment, the sensor 149 is a three-dimensional sensor, an optical sensor, an infrared sensor, a dual-axis camera sensor, or a radar sensor.

Similarly, the second floating images G2 displayed by the second floating image display device 15 and the integrated floating image GIN jointly displayed by the first floating image display device 14 and the second floating image display device 15 can also interact with the fingers, the electronic interactive gloves ECL, and the pen-shaped interactive components P, so as to determine a subsequent image display content.

Furthermore, the user can also use the first floating image display device 14 and the second floating image display device 15 to directly draw lines, planes, and stereoscopic compositions that can be formed in a space.

As shown in FIG. 14, FIG. 15, FIG. 16, and FIG. 17, the user can use the hands, the pen-shaped interactive element PT, and the electronic interactive gloves ECL to draw a plurality of trajectories PH1-PHN in the space on one side of the first floating image display device 14, and then move, adjust, or connect the trajectories PH1-PHN to one another, so as to create the first floating images G1.

In addition, the first floating image display device 14 can also include a program including a plurality of function processing procedures corresponding to a plurality of three-dimensional function buttons FBN. The three-dimensional function buttons FBN are also displayed in the space on the one side of the first floating image display device 14 through the first display module 141, in a manner similar to that of the first floating images G1.

In addition, the user can select one of the three-dimensional function buttons FBN, e.g., having functions of coloring, zooming, adjusting materials, etc., to process a part of or all of the first floating images G1.

That is to say, the user can selectively process a planar area, a stereoscopic area, or an entire area formed by the trajectories PH1-PHN. Similar to the first embodiment, the first floating images G1 can be displayed in a space on one side of the first floating image display device 14 in a form of an exploded view.

In addition, the first floating image display device 14 can communicatively connect to the server 9 through the controller 11 and the communication module. The server 9 can undertake a calculation of a great amount of the trajectories PH1-PHN of the first floating images G1. In this embodiment, the calculation of the two-dimensional image and the three-dimensional image can be processed by the first floating image display device 14 and the controller 11, or processed by the server 9 remotely through cloud computing, and then a result of the calculation of the two-dimensional image and the three-dimensional image are transmitted to the controller 11.

[Beneficial Effects of the Embodiments]

One of the beneficial effects of the floating image system of the present disclosure is that the floating image system is able to provide a background that can simultaneously display the two-dimensional image and the three-dimensional floating image through a single floating image display device or a plurality of floating image display devices, so as to present a rich visual environment that can effectively improve the user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

Alternative embodiments will become apparent to those skilled in the art to which the present disclosure pertains without departing from its spirit and scope.

What is claimed is:

1. A floating image system, comprising:
   a controller;
   a first floating image display device electrically connected to the controller;
   a second floating image display device electrically connected to the controller, the second floating display device being detachably connected to the first floating image display device; and
   an environment detection device for detecting a plurality of first environment images on a second side of the first floating image display device and a plurality of second environment images on a second side of the second floating image display device, the environment detection device being electrically connected to the controller, and the first environment images and the second environment images being transferred to the controller;

wherein the first floating image display device and the second floating image display device provide a plurality of first floating images and a plurality of second floating images, respectively, so as to jointly display an integrated floating image;

wherein the first floating image display device displays the first floating images in a space on a first side of the first floating image display device, the second floating image display device displays the second floating images in a space on a first side of the second floating image display device, and the integrated floating image is displayed within a space between the first floating image display device and the second floating image display device;

wherein the plurality of first floating images, the plurality of second floating images, and the integrated floating image interact with an object and deformations of the integrated floating image are caused accordingly.

2. The floating image system according to claim 1, further comprising:
a connecting module disposed between the first floating image display device and the second floating image display device, the first floating image display device being connected to the second floating image display device through the connecting module, and an angle being defined between the first floating image display device and the second floating image display device.

3. The floating image system according to claim 1, wherein the controller displays a plurality of first environment adjustment images on a first display module on the first side of the first floating image display device, according to the first environment images.

4. The floating image system according to claim 3, wherein the controller displays a plurality of second environment adjustment images on a second display module on the first side of the second floating image display device, according to the second environment images.

5. The floating image system according to claim 4, further comprising an eye tracking sensor disposed on the first side of the first floating image display device or on the first side of the second floating image display device, so as to detect a user eyesight signal.

6. The floating image system according to claim 5, wherein the user eyesight signal detected by the eye tracking sensor includes a pupil position and an eyesight angle of a user.

7. The floating image system according to claim 6, wherein the controller adjusts the first environment adjustment images displayed by the first display module or the second environment adjustment images displayed by the second display module, according to the user eyesight signal.

8. The floating image system according to claim 7, wherein the controller is communicatively connected to a server, the controller of the floating image system transmits the first floating images, the second floating images, the integrated floating image, the first environment images, the second environment images, the first environment adjustment images, and the second environment adjustment images to the server for calculation.

9. The floating image system according to claim 8, further comprising:
a storage module electrically connected to the controller;
a communication module electrically connected to the controller; and
a power module electrically connected to the controller and providing a driving power to the controller, the storage module, the communication module, the first floating image display device, the second floating image display device, the environment detection device, and the eye tracking sensor;

wherein the first floating images, the second floating images, the integrated floating image, the first environment images, the second environment images, the first environment adjustment images, and the second environment adjustment images are stored in the storage module;

wherein the controller is communicatively connected to the server through the communication module.

10. The floating image system according to claim 1, wherein the floating image system detects a three-dimensional coordinate of the object, so as to enable the object to interact with the first floating images, the second floating images, and the integrated floating image displayed by the floating image system.

11. A floating image system, comprising:
a controller; and
a first floating image display device electrically connected to the controller, the first floating image display device being foldable, wherein, when the first floating image display device is folded, the first floating image display device includes at least one first floating image display area and a second floating image display area, the first floating image display area and the second floating image display area are arranged adjacent to each other, and a display angle is defined between the first floating image display area and the second floating image display area; and
an environment detection device for detecting a plurality of first environment images on a second side of the first floating image display device and a plurality of second environment images on a second side of the second floating image display device, the environment detection device being electrically connected to the controller, and the first environment images and the second environment images being transferred to the controller;

wherein the first floating image display area and the second floating image display area of the first floating image display device provide a plurality of first floating images and a plurality of second floating images, respectively, so as to jointly display an integrated floating image;

wherein the first floating image display area displays the first floating images in a space on a first side of the first floating image display area, the second floating image display area displays the second floating images in a space on a first side of the second floating image display area, and the integrated floating image is displayed within a space between the first floating image display area and the second floating image display area;

wherein the integrated floating image interacts with an object and deformations of the integrated floating image are caused accordingly.

12. The floating image system according to claim 11, wherein the first floating image display device further includes a third floating image display area, the first floating image display area, the second floating image display area, and the third floating image display area are arranged adjacent to one another, the third floating image display area provides a plurality of third floating images, and the first floating images, the second floating images, and the third floating images jointly display the floating images.

* * * * *